US010324701B1

(12) United States Patent
Stickle et al.

(10) Patent No.: US 10,324,701 B1
(45) Date of Patent: Jun. 18, 2019

(54) RAPID DEPLOYMENT OF COMPUTING INSTANCES

(71) Applicant: Amazon Technologies, Inc., Seattle, WA (US)

(72) Inventors: Thomas Charles Stickle, Saint James, NY (US); Michael Charles Pfeiffer, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/832,906

(22) Filed: Aug. 21, 2015

(51) Int. Cl.
*G06F 8/61* (2018.01)
*G06F 8/71* (2018.01)

(52) U.S. Cl.
CPC . *G06F 8/63* (2013.01); *G06F 8/71* (2013.01)

(58) Field of Classification Search
CPC .................................... G06F 8/63; G06F 8/71
See application file for complete search history.

(56) References Cited

U.S. PATENT DOCUMENTS

| | | | | |
|---|---|---|---|---|
| 9,628,436 B1* | 4/2017 | Britt | ................. | H04L 61/1511 |
| 2007/0214350 A1* | 9/2007 | Isaacson | ............ | G06F 9/45533 |
| | | | | 713/2 |
| 2011/0035747 A1* | 2/2011 | Machida | ................... | G06F 8/63 |
| | | | | 718/100 |
| 2011/0265082 A1* | 10/2011 | Ashok | ...................... | G06F 8/63 |
| | | | | 718/1 |
| 2012/0311575 A1* | 12/2012 | Song | ..................... | G06F 9/5077 |
| | | | | 718/1 |
| 2013/0247036 A1* | 9/2013 | Fujiwara | ................. | G06F 9/455 |
| | | | | 718/1 |
| 2014/0075435 A1* | 3/2014 | Assuncao | ........... | G06F 9/45558 |
| | | | | 718/1 |
| 2016/0098288 A1* | 4/2016 | Petrov | ...................... | G06F 8/61 |
| | | | | 718/1 |

\* cited by examiner

*Primary Examiner* — Wei Y Zhen
*Assistant Examiner* — Amir Soltanzadeh
(74) *Attorney, Agent, or Firm* — Thorpe North & Western, LLP

(57) ABSTRACT

Technology for rapid deployment of computing instances from images is provided. In one example, a method may include instantiating a base computing instance and building an application layer on the base computing instance to create a modified computing instance. A machine image of the modified computing instance may be saved. The modified computing instance may be instantiated based on the machine image and a customer-defined configuration may be applied to the modified computing instance to obtain a configured computing instance.

18 Claims, 8 Drawing Sheets

RAPID DEPLOYMENT OF COMPUTING INSTANCES

BACKGROUND

Computing devices often utilize a communication network or a series of communication networks to exchange data. Companies and organizations operate computer networks that interconnect a number of computing devices to support computing operations or provide services to other parties. The computing devices may be located in a single geographic location or may be located in multiple, distinct geographic locations (e.g., interconnected via private or public communication networks). For instance, larger data centers or data processing centers may include a number of interconnected computing systems that provide computing resources to customers of the data center. Using virtualization technologies, utilization of data center resources may be increased by configuring a single physical computing device to host one or more computing instances that appear to operate as independent computing devices to users of a data center.

Starting and setting up computing instances and services in a service provider environment using virtualization technology may be complex. From initiating the computing instances to downloading and installing software, as well as applying any desired configurations, the process may consume hours, days or longer to complete. In addition, learning and implementing best practices for security, availability and other features can result in additional complexity and time consumption.

DETAILED DESCRIPTION

Figure 1:
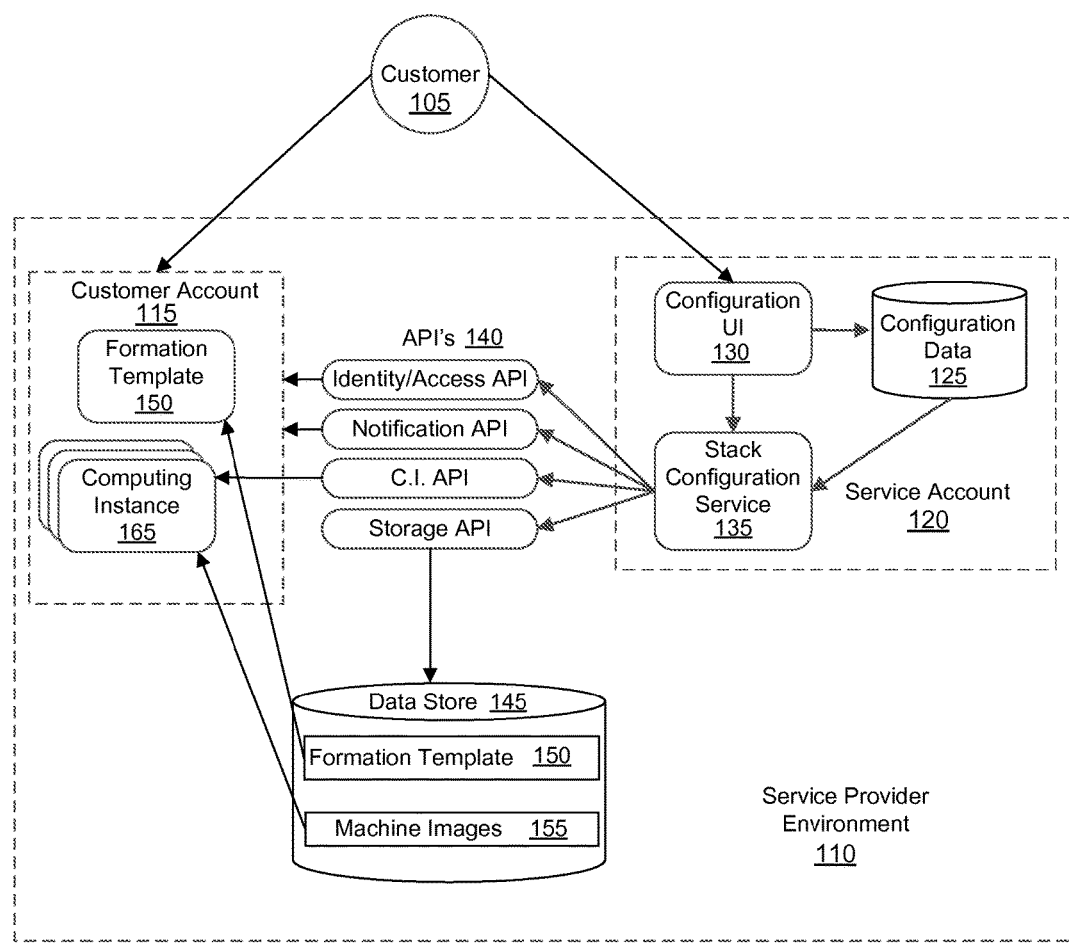
FIG. 1 is a schematic overview of a system for rapid deployment of computing instances using a service account and a customer account in accordance with an example of the present technology.

Technology for rapid deployment of computing instances from machine images is provided. In one example, a method may include instantiating a base computing instance from an installation image and building an application layer on the base computing instance to create a modified computing instance. An image of the modified computing instance may be saved as a machine image. The modified computing instance may be instantiated based on the machine image and a customer-defined configuration may be applied to the modified computing instance to obtain a configured computing instance and complete a configuration process.

In a more detailed example, a method for rapid deployment of computing instances may be provided which includes instantiating a base computing instance from an install image using a service account for a computing service provider. An application layer may be built on the base computing instance in the service account to create a modified computing instance. The application layer may be built by installing software on the base computing instance. A machine image of the modified computing instance may be created or captured. The machine image may be stored in an image data store. The machine image may be provided for use by a customer. The modified computing instance may be instantiated in a customer account using on the machine image. Instantiation may refer to the initialization and/or execution of a computing instance, such as a virtual machine, which initialization may be based off of a machine image, a template or some other pre-defined computing configuration. A customer-defined configuration may be applied to the modified computing instance based on instructions from the customer, such as by defining a domain, CIDR (Classless Inter-Domain Routing) range, etc.

The present technology may provide reference machine images or architectures to enable customers to easily start and test computing instances running enterprise software in a service provider environment. A manual process of starting computing instances, downloading and installing the software, applying patches, configurations, etc. may often be a time consuming process. However, with the present technology, a customer may make a limited number of configuration selections (e.g., two or three) and press a button in a graphical user interface (GUI) to have the enterprise software ready and available to use or test within a short period of time, such as minutes or tens of minutes and the computing instance and software may be set up following industry best practices for security, performance and so forth without the time invested in learning and implementing these best practices.

Customers or potential customers may sometimes desire a proof of concept computing environment with one or more enterprise software packages executing in a service provider environment on one or more computing instances. Such a computing environment enables valuable testing prior to deployment. The present technology reduces deployment time and effort in this testing process to enable these customers to quickly and easily see and test computing environments which may later be moved to the customer's development, production or other environments.

The present technology may build a collection of static machine images or fully installed and functional machine images that are usable individually or in combination with other machine images to create one or more software stacks on one or more computing instances. The machine images may be images captured after any number of operations have taken place, including: instantiating a computing instance with a bare operating system, applying any applicable updates or patches to the operating system, installing a desired software application package, applying any applicable updates or patches to the software application package, and performing best practice configurations for security, performance and the like. Machine images may be captured for a variety of types of software packages, computing instance types, best practice configurations and so forth.

When a customer desires to test a software package, then after selecting the desired software package and optionally selecting the type of computing instance and/or configurations desired, the computing instance may be instantiated and be ready to use, explore, test and perform operations in a short period of time, such as 20 minutes or less, 10 minutes or less, etc. When the customer makes a selection, the service provider may simply select the appropriate snapshot machine image corresponding to the customer's selections without performing the work of installing, patching, configuring, etc. at the time of the request, since these actions were performed prior to the request for a variety of potential customer selections.

The service provider environment may provide a framework for static machine images that are useable together in different ways. For example, the computing service provider may enable the customer to apply desired network or domain settings, define desired CIDR (Classless Inter-Domain Routing) ranges to use in the requested computing environment and so forth. These settings may be applied to one or more machine images after instantiation to enable the software packages executing on the computing instances to communicate and interact (e.g., be interoperable).

In contrast to other methods which provide more configurability options to the customer, the present technology reduces the time, expense, complexity and effort in setting up and configuring a desired computing environment. As a result, customers are able to test the software and environment much more rapidly.

In one example, time usage of services in a service provider environment entails additional fees, resulting in an overall increase in expense to test enterprise software or the like in the service provider environment. Where an individual or organization desires to test services or software in the service provider environment, the complexity, time and cost may be deterrents and may lead to loss of potential growth for the computing service provider. Reduction in the complexity, time and cost may lead to increased conversion of potential customers, increased customer satisfaction, and increased growth for the computing service provider.

Reference will now be made to FIG. 1. The present technology defines an approach for building software stacks or machine images which are delivered with pre-built resources via a service. For example, the customer 105 may interact with a configuration UI 130, enter desired configuration information (e.g., a desired domain name and network address), and the computing service provider may assemble the resources into machine images, snapshots, and formation templates which are then available to the customer's account 115 to launch. In some examples, an enterprise software build has been reduced from greater than three hours time to launch from the time of request to less than 20 minutes from the time of request. For reference builds where a time to generate the reference is difficult to reduce significantly, costs expended by the customer may be deferred by building the images in a service account for the computing service provider and subsequently transferring, sharing, or otherwise making computing resources available for a customer account 115 to use.

The process of assembling resources, such as computing instances and software, into machine images and snapshots may be straightforward for a demonstration environment. For example, machine images may be prebuilt with arbitrary domain names and network CIDR blocks that would apply equally for any customer 105 to try. While this is effective for demonstration purposes, this path may be less effective for pilot environments, test environments or production environments because each customer will have different network topologies, domain names, and general infrastructure in place. In those cases, the assembly process may involve a more sophisticated approach using pre-staged resources and dynamic configuration of these resources.

FIG. 1 illustrates an example implementation where a service account 120 used to generate machine images of computing instances running any one or more of a variety of software stacks is accessed by a customer to select one or more desired machine images and apply a configuration to the machine images. The generation of the machine images for selection by the customer is described in additional detail later, such as with regard to FIG. 2. The service account 120 may belong to the computing service provider supplying the service provider environment 110 through which computing instances and software are made accessible. The customer account 115 may be an account created by a customer 105 and paid for by the customer 105 to access the resources, such as computing instances, software and the like, accessible through the service provider environment 110 from the computing service provider. The account segmentation of FIG. 1 enables a reduction in cost and time to launch for customers to launch and test the computing environments that may include the computing instances 165 and software executing thereon.

Snapshot images of the computing resources (e.g., computing instances or other executing objects) in a service provider environment may be made available to the customer account 115 upon request by the customer 105. Making the machine images available to the customer 105 may entail, for example, permitting a customer 105 to access the service account 120 and test the environment within the service account 120. In one example, the service account 120 may be a managed account managed on behalf of the customer 105. Making the images available to the customer 105 may entail transferring or copying the images to the customer account 115 for the customer to run and test the computing instances and software in the customer's own account. Making the images available to the customer account 115 may involve changing permissions, rights, visibility, and so forth related to the images such that the customer may access, execute, download, copy, transfer or perform other desired operations in order to test the desired environment.

FIG. 1 illustrates a provisioning platform workflow. FIG. 1 assumes the prior creation of snapshot machine images of a variety of potentially desirable computing instances, software stacks and the like in various combinations. As may be understood, a variety of computing instance types may exist. The following Table 1 illustrates some example computing instance types categorized by "family", where a computing instance family represents a performance characteristic specific to each of the computing instance types in that family.

TABLE 1

| Instance Family | Computing instance Types |
|---|---|
| General purpose | t2.micro ǀ t2.small ǀ t2.medium ǀ m3.medium ǀ m3.large ǀ m3.xlarge ǀ m3.2xlarge |

TABLE 1-continued

| Instance Family | Computing instance Types |
|---|---|
| Compute optimized | c3.large | c3.xlarge | c3.2xlarge | c3.4xlarge | c3.8xlarge |
| Memory optimized | r3.large | r3.xlarge | r3.2xlarge | r3.4xlarge | r3.8xlarge |
| Storage optimized | i2.xlarge | i2.2xlarge | i2.4xlarge | i2.8xlarge | hs1.8xlarge |
| GPU mstances | g2.2xlarge |

The computing instance types may vary, for example, in compute units, architecture, memory, storage, I/O (Input/Output) performance, and so forth. Because a customer may arbitrarily select any one of these computing instances for testing an enterprise software package, the present technology may generate machine images for the computing instance types and the enterprise software package for: some computing instance types, a majority of computing instance types or each of the computing instance types. The same process may be repeated for any other enterprise software package offered by the computing service provider. The creation and availability of machine images of computing instance types with various software packages may be dependent at least partially on demand for such combinations. For example, if a very small percentage of customers desire a specific combination and a very large percentage of customers desire a couple of popular combinations, these popular combinations may be available for rapid deployment by the customers where the less popular combination may be less likely to be available to customers.

A customer 105 may interact with a stack configuration service 135 using a dynamic configuration UI (user interface) 130 for the service account. The configuration UI 130 may be used to receive configuration options, which may be stored as configuration data 125. The configuration data 125 may be accessed by the stack configuration service 135 to make API (Application Programming Interface) calls 140 to instantiate computing instances 165, configure data storage options for the customer, manage customer identity and access rights, send notifications to the customer and so forth. Some example APIs illustrated in FIG. 1 for making these API calls include the Identity/Access API, a Notification API, a Computing Instance (CI) API, and a storage API. The stack configuration service 135 may make the API calls 140 based on the interactions of the customer 105 with the configuration UI 130. The API calls 140 may cause computing instances 165 to be instantiated in the customer account 115 using machine images stored 155 in a machine images data store. Also, the stack configuration service 135 may cause a formation template 150 to be created and stored. The formation template 150 may include the identity of the machine images 155 the customer is using and the configuration data 125 entered by the customer 105. For example, the formation template 150 may include an identification number or reference number for the machine images 155 or may include a link to the machine images 155. The formation template 150 may be used to subsequently replicate a created computing environment while avoiding going through the configuration process again, making reuse of the computing environment simpler for the customer 105. The formation template 150 may be made available to the customer 105, or sent to the customer 105. In one example, the notification API may be used to push a notification to the customer including a URL (Uniform Resource Locator) for accessing the formation template. The stack configuration service 135 may generate the formation template 150 and place the formation template 150 in a storage bucket (e.g., data store 145) for access by the customer 105 and/or may push the formation template 150 to the customer account 115.

Use of the service account 120 enables the customer 105 to access and use the pre-generated machine images including the desired software packages. The computing instances prior to configuration with the software packages may be base computing instances. The computing instances from which the machine images are captured may be modified computing instances because the base computing instance has been modified through the installation of the software. The machine images deployed to the customer account may be configured computing instances because the modified computing instances have been configured using configuration data input by the customer through the configuration UI.

The formation template may be used for recreating the configured computing instances. The configuration data referenced by the formation template may represent the customer's selection of a computing instance type, a desired software stack, and desired data, such as a customer's domain name or the like. The stack configuration service may identify the appropriate machine images for use in meeting the customer's requests, assemble these machine images and instantiate them on computing instances in the customer account and also apply the customer-defined configurations, such as a domain to the computing instances. The stack configuration service may identify the appropriate customer account into which to deploy the computing instances, using the computing instance API, using customer account access credentials provided by the customer, a customer account number, and the Identity/Access API, for example.

The present technology may provide a system for enabling rapid deployment of fully functional computing instances and software stacks. Rather than starting from scratch upon request from a customer, the combination of computing instance and software stack is prebuilt and readily available. Informal studies have shown that customers are more inclined to try a software stack that can be selected and run in under an hour, but are less likely to try stacks that take more than an hour to start. By enabling rapid deployment of pre-generated machine images, the time to launch may be reduced to a matter of minutes significantly less than an hour, resulting in an increased likelihood that the customer will try the stack.

Figure 2:
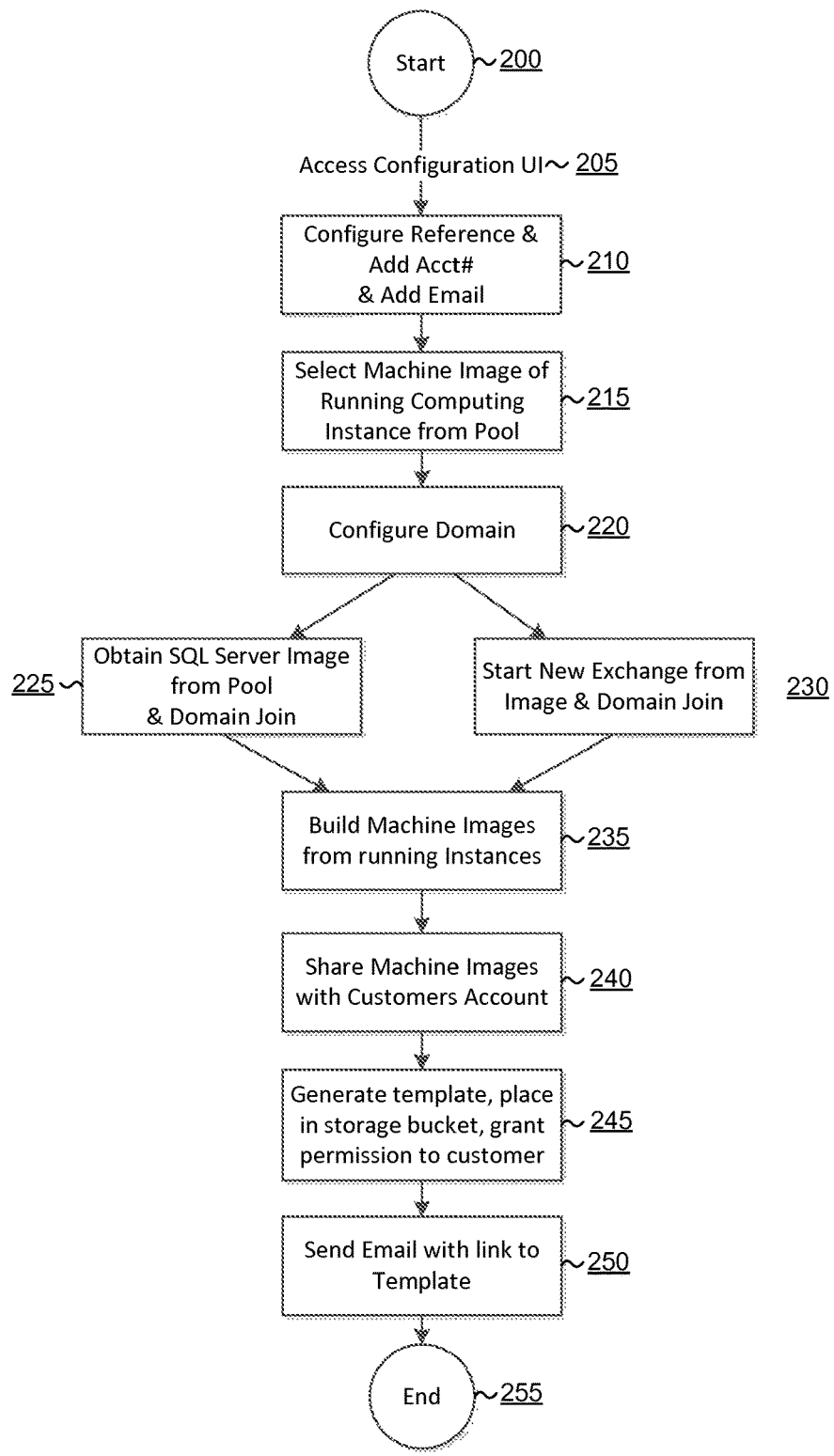
FIG. 2 is a schematic overview of a method for rapid deployment of computing instances in accordance with an example of the present technology.

Reference will now be made to FIG. 2. FIG. 2 illustrates an example flow diagram relating to a process for pre-building machine images and then rapidly deploying computing instances to a customer account in accordance with an example of the present technology. At the start 200, a customer may access the configuration UI 205. The configuration UI may prompt a user to enter and receive configuration data from the user, such as a customer account number, customer email address and/or other identifying information at 210. Additionally, at 215, the customer may select via the configuration UI a desired computing instance type and software stack from a pool of available options. The customer may further input domain or other configuration data at 220 which may be used to configure the domain for the selected computing instance type.

In this example, a SQL (structured query language) server image (e.g., a machine image) may be obtained 225 from the pool based on the customer selection and joined to the customer identified domain. Additionally, a new exchange server image may be obtained 230 from the pool based on the customer selection and joined to the customer identified domain. The SQL server and exchange server may be instantiated, domain joined, etc. in a service account. Machines images of each computing instance instantiated based on the customer request (e.g., SQL server and exchange server in this example) may be built 235. These images (e.g., machine images) may be shared 240 with a customer account, such as by account number. The machine images may be shared using an image identifier associated with the machine images. A formation template for the machine image combination, including the customer defined configuration data, may be generated 245 and stored in a storage bucket with permission thereto granted to the customer. An email or other electronic communication may be sent 250 to the customer account, to the customer email address or the like with a link to the formation template for the customer to access and use according to the permissions granted prior to termination of the flow at end 255.

When building a computing environment in this manner for the customer, including the customer defined configuration data early on in the process may be valuable. As may be appreciated, the greater the degree of modification or configuration of a computing environment that occurs during an installation, the more difficult modifying that configuration may be later in a process. In some examples, changing a domain name may be a complex process. In one example, a domain name may be assumed in creating the machine images and a second domain may be joined with the first domain based on the customer input because adding a secondary domain may be a less complex process than replacing the primary or first domain name assumed for purposes of creating the machine images. In other examples, the machine images may be created using the customer supplied domain information. In some examples, where an assumed domain is used in a computing resource and the customer domain is appended in the computing resource, the time to launch may be as little as 2-3 minutes, for example. Whereas generating computing resources from machine images incorporating the customer domain from the start may launch in as little as 15 minutes or less.

In some examples, a customer may select a variety of computing instances and software stacks that are intended to interact with one another. As a result, some dependencies may be present which may be identified by a stack configuration service which may start or instantiate computing instances based on the machine images in a defined sequence. In other examples, although the software stacks may interact, dependencies may not exist such that the stack configuration service instantiates the instances in the sequence. Rather, the stack configuration service may instantiate the computing instances in parallel to further reduce a time from the customer request to the availability of the requested computing environment.

Some contemplated, non-exhaustive examples of customer definable configurations for applying to prebuilt machine images may include one or more of the following configurable items: domain names, CIDR ranges or IP (Internet Protocol) ranges, SSL (Secure Socket Layer) certificates (which may generally include a domain name stamp), IP settings, server names, storage configuration (if customized) for connecting to block storage volumes or the like (e.g., block storage volumes may be striped or may run an LVM (logical volume manager) on top of a striped volume for snapshots or backups of volumes, etc. to achieve desired performance characteristics for throughput or latency, etc. selectable by the customer using a slider, button or other graphical user interface item), DNS (Domain Name System) entries (e.g., to change DNS entries to optimize for latency, account for geolocation, etc.), load balancing, username/password entry (e.g., using a relational database service), and so forth. Software licenses may optionally be part of the customer definable configurations, but such licenses may also easily be applied later.

In one scenario, a domain may be configured for the combination of computing instances with software stacks and the computing instances and/or computing resources may be rebooted. Once all of the components of the desired computing environment have been assembled and otherwise configured, snapshots may be captured and shared with the customer account, together with a generated formation template with permissions granted for the customer to execute the formation template.

Many configuration options may be configured in an automated manner using a script. Use of an automated script to apply customer defined configuration may simplify the process for the customer to use the computing environment as desired without the effort and knowledge otherwise involved in applying the configuration changes manually.

Figure 3:
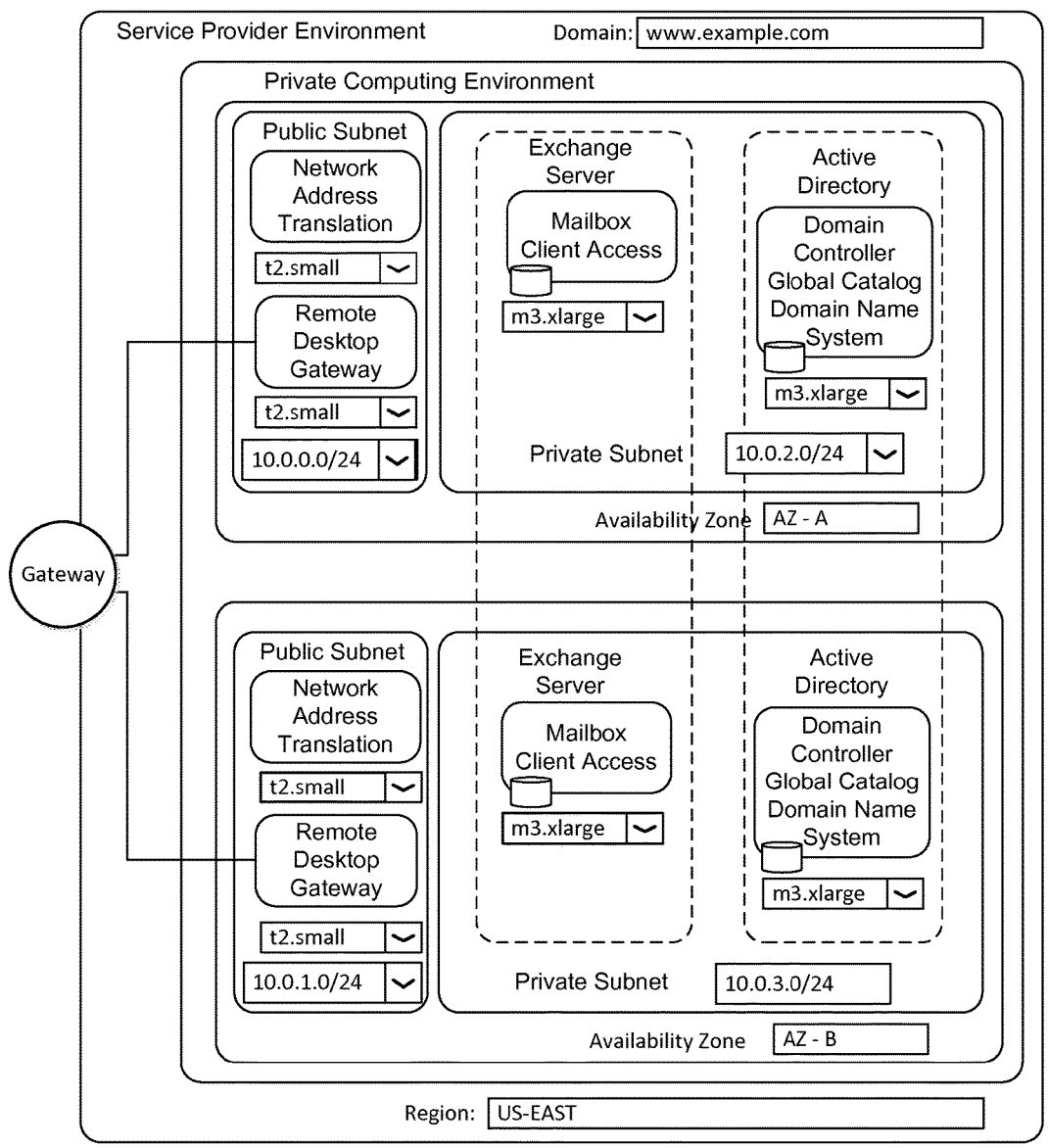
FIG. 3 is a user interface for a customer to input configuration data and cause deployment of computing instances in accordance with an example of the present technology.

FIG. 3 illustrates an example user interface for the customer to interact with the stack configuration service in selecting configuration options to be applied to machine images. Software for the machine images may be selected by the customer in a higher level interface, for example, where the interface of FIG. 3 illustrates configuration options appertaining to a selected software stack. FIG. 3 illustrates an example where the software stack includes exchange servers and active directory servers. Based on the selected software stack and the configuration options selected by the customer through the interface of FIG. 3, a machine image may be selected for configuration. The machine image may represent a modified computing instance including the software stack.

Changes to the configuration options in FIG. 3 result in a change to which pre-prepared image is selected for use. Some default configuration options may be available or provided by default which represent configuration options used or desired by a majority of customers. For example, the default configuration may represent a configuration desired by 80% of the customer population. The default configuration may default certain configurations for computing instance types, subnet configurations, etc., but may optionally still prompt the customer to enter the domain or other configuration data which is highly customer specific. Use of one or more defaults or preset configurations made available in a pool of options from which the customer may select may enable hiding of many of the details from customers, which may be technical, confusing, and/or time consuming to configure.

In one example, multiple default configurations for different software stacks may have a same or similar topology, but selection of a software stack determines which machine image is selected for use. So, customers may desire SQL servers that are highly available in multiple availability zones. These SQL servers may be set up with various configuration options which are pre-installed into the machine images and readily available for use by the customers. The machine images using default configurations may have many configurable options preset. Scripts or other quick commands may be available to automatically change some settings, such as changing a value of a parameter from a 0 to a 1, or vice versa, based on customer input. For example, the machine images may include fully installed and functional software images and the configuration may be performed by the execution of the command to change an existing configuration item. The command may be executed using a WINDOWS® powershell script, for example, or any other suitable task automation and configuration management framework script.

The configuration items selected through the interface of FIG. 3 may be represented in the formation template. The formation template is usable to rebuild the environment in separate environments, such as moving from a development environment to a test environment to a production environment, and so forth using the user defined (or default) configuration settings together with machine image identifiers for the appropriate machine images for the customer's selections. The formation template may further define security groups, subnets, traffic rules, routing tables, isolation zones for security or other details desired by the customer. The template may hide many of the details to simplify a process for the customer. Additionally, the template may allow the customer to run the configured computing environment in the customer's own account rather than a managed service account. Use of the template enables the customer to avoid many of the fine details or interaction with any computing code involved in the configuration.

The user interface of FIG. 3 may represent a functional snapshot of what will be created for the customer, or rather includes a diagram illustrating the general architecture representing the options selected by the customer. The user interface is an actionable architecture diagram to enable the customer to interact with the architecture diagram to make configuration changes. A useful configuration change customers may often desire includes networking options (subnets, domains, CIDR ranges, etc.), but instance sizes and other configuration options may also be present.

The interface of FIG. 3 may represent an interface a customer uses prior to launching a desired computing environment. For example, a customer (or potential customer) may have just discovered the option to use the present technology and wishes to test a computing environment and evaluate how the computing environment would fit with their business, other computing environments and so forth. The architecture diagram may be dynamically modified based on configuration or other options selected by the customer.

Figure 4:
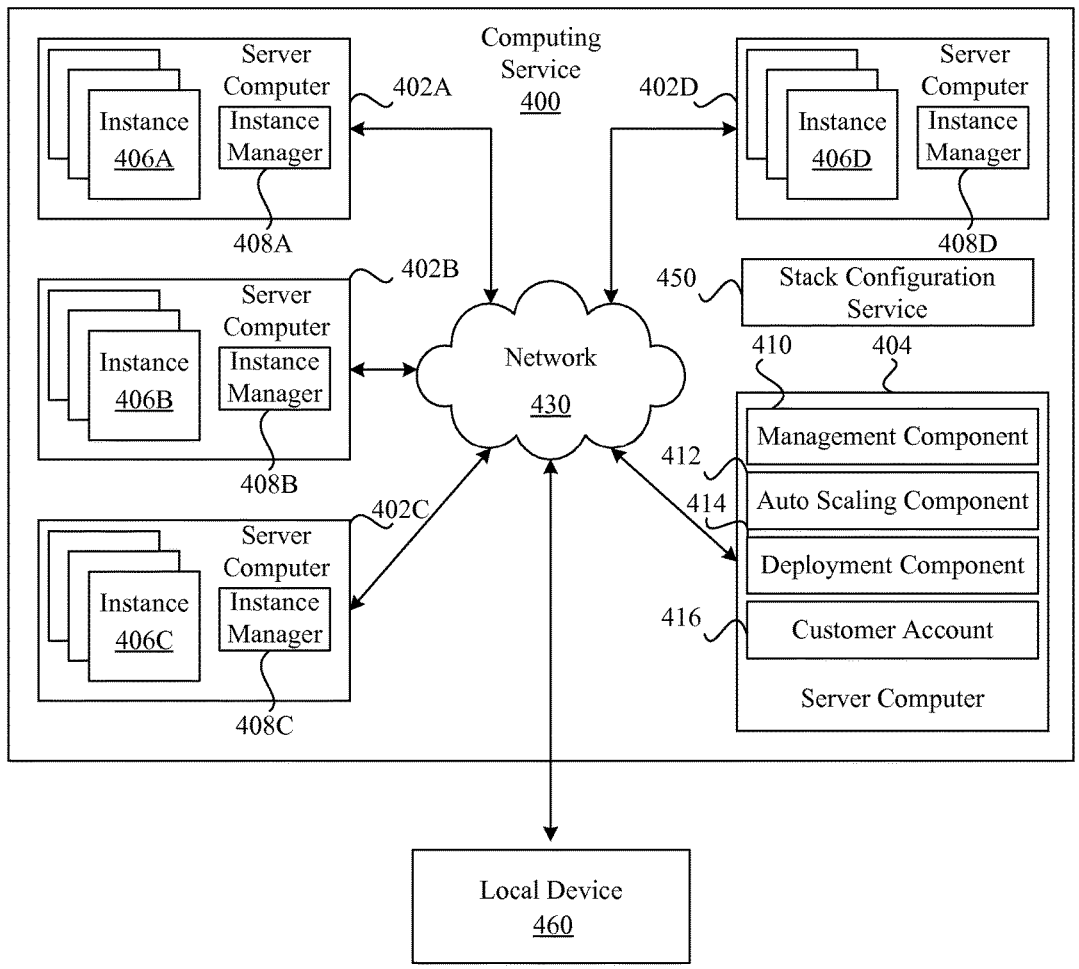
FIG. 4 is a schematic overview of a virtual computing resource provider in accordance with an example of the present technology.

The stack configuration service, service accounts, customer accounts, computing instances and so forth may be executed or maintained in a data center for a computing service provider. FIG. 4 illustrates how components of a data center may function as a computing service 400 in a service provider environment to provide a platform for computing instances which the present technology may use to execute nodes as described. The computing service 400 (i.e., the cloud provider or service provider) may be capable of delivery of computing and storage capacity as a service to a community of end recipients. In an example implementation, the computing service may be established for an organization by or on behalf of the organization. That is, the computing service 400 may offer a "private cloud environment." In another implementation, the computing service 400 may support a multi-tenant environment, wherein a plurality of customers operate independently (i.e., a public cloud environment). Generally speaking, the computing service 400 can provide the following models: Infrastructure as a Service ("IaaS"), Platform as a Service ("PaaS"), and/or Software as a Service ("SaaS"). Other models may also be provided. In some implementations, end users access the computing service 400 using networked client devices, such as desktop computers, laptops, tablets, smartphones, etc running web browsers or other lightweight client applications. Those skilled in the art will recognize that the computing service 400 can be described as a "cloud" environment.

The particularly illustrated computing service 400 may include a plurality of server computers 402A-402D. While four server computers are shown, any number may be used, and large centers may include thousands of server computers. The server computers 402A-402D may provide computing resources for executing software instances 406A-406D. In one implementation, the instances 406A-406D may be virtual machines. A virtual machine may be an instance of a software implementation of a machine (i.e. a computer) that executes applications like a physical machine. In the example of virtual machine, each of the servers 402A-402D may be configured to execute an instance manager 408 capable of executing the instances. The instance manager 408 may be a hypervisor or another type of program configured to enable the execution of multiple instances 406 on a single server. Additionally, each of the instances 406 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 404 may be reserved for executing software components for managing the operation of the server computers 402 and the instances 406. For example, the server computer 404 may execute a management component 410. A customer may access the management component 410 to configure various aspects of the operation of the instances 406 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 412 may scale the instances 406 vertically or horizontally based upon rules defined by the customer. In one implementation, the auto scaling component 412 allows a customer to specify scale-up policies for use in determining when new instances should be instantiated, including what type of instance to instantiate, and scale-down policies for use in determining when existing instances should be terminated. The auto scaling component 412 may consist of a number of subcomponents executing on different server computers 402 or other computing devices. The auto scaling component 412 may monitor available computing resources over an internal management network and modify resources available based on predictions of need as well as based on actual need.

A deployment component 414 may be used to assist customers in the deployment of new instances 406 of computing resources. The deployment component 414 may have access to account information associated with the instances, such as who is the owner of the account, credit card information, country of the owner, etc. The deployment component 414 may receive a configuration from a customer that includes data describing how new instances 406 should be configured. For example, the configuration may specify one or more applications to be installed in new instances 406, provide scripts and/or other types of code to be executed for configuring new instances 406, provide cache logic specifying how an application cache should be prepared, and other types of information. The deployment component 414 may utilize the customer-provided configuration and cache logic to configure, prime, and launch new instances 406. The configuration, cache logic, and other information may be specified by a customer using the management component 410 or by providing this information directly to the deployment component 414.

Customer account information 416 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 400 may be used to host or provide any number of potential services to customers, such as storage, compute, or other services. In one example, a stack configuration service 450 may be provided for enabling rapid deployment of computing instances as has been described. The stack configuration service 450 may provide an actionable user interface for selecting and configuring computing instance options and for coordinating the launch and configuration of these computing instances based on machine images having one or more software stacks installed thereon.

A network 430 may be utilized to interconnect the server computers 402A-402D and the server computer 404. The network 430 may be a local area network (LAN) and may be connected to a Wide Area Network (WAN) 440 so that end users may access the computing service 400. It should be appreciated that the network topology illustrated in FIG. 4 has been simplified and that many more networks and networking devices may be utilized to interconnect the various computing systems disclosed herein.

Figure 5:
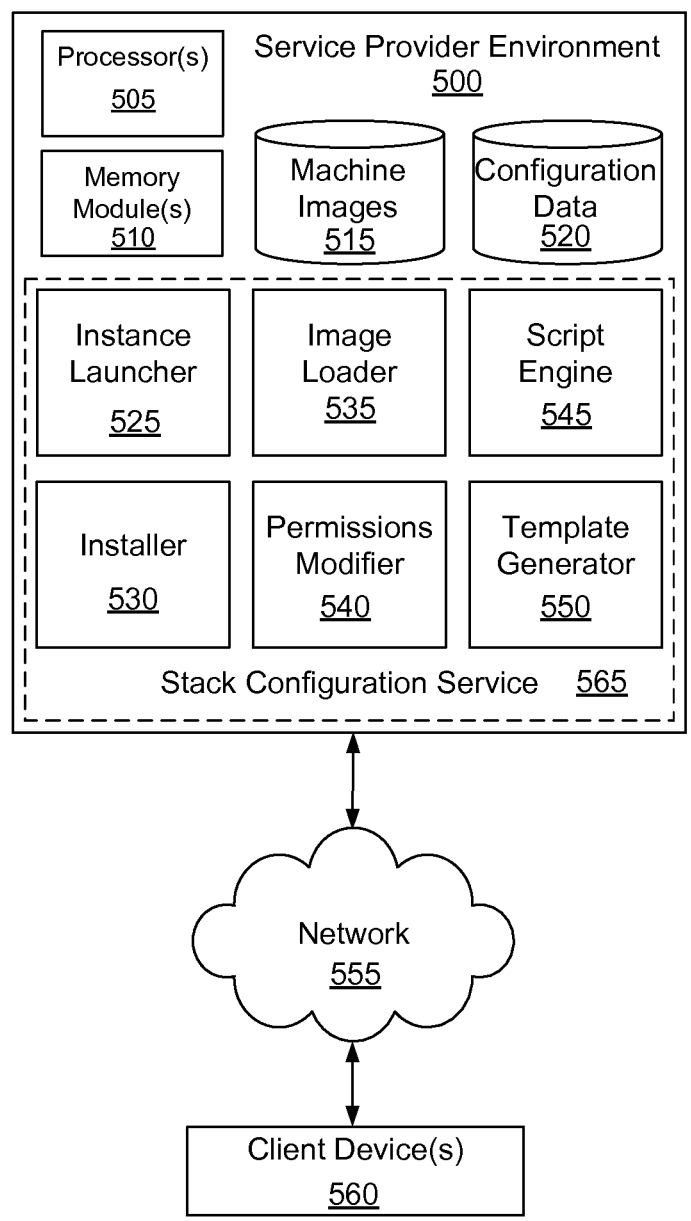
FIG. 5 is a block diagram of a system for a rapid computing instance deployment system in accordance with an example of the present technology.

Referring now to FIG. 5, a block diagram of a system in a service provider environment 500 for implementing rapid deployment of computing instances is illustrated in accordance with an example of the present technology. The system elements may be implemented using one or more computing devices in a service provider environment, such as a server as an example computing device, as well as client devices 560, and may be implemented across a network 555. The system may include one or more data stores 515-520 and a number of modules 525-550 as part of a stack configuration service 565 for storing and processing data to be used in the rapid deployment of computing instances.

Computing services offered by a service provider environment, may include a computing device that executes one or more servers or computing instances on the computing device. One or more servers (e.g. a computing instance operating as a server) may be operated to execute an operating system and implement a communications application which is scalable and asynchronous. A user may create, launch, and terminate servers as desired. The user may have some control over the geographical location of servers or clusters of servers to optimize latency and provide high levels of redundancy.

The customer at client device 560 may access and manage the one or more servers over a network 555 connection, such as a connection through the Internet, for example. The customer may perform various operations on the servers such as adding, updating, modifying, deleting or other otherwise maintaining software or services on the servers. These operations may be performed by the customer from the client device 560. These operations may be performed over a communications network (e.g., network 555). For example, instructions to test, configure, execute, initiate, terminate or otherwise interact with computing services may be performed over the network 555.

The server(s) may be a virtual computing instance as previously explained, and the virtual computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisors and virtualization control plane) may provide platforms on which virtual computing instances may be created. In other words, the virtual computing instances may execute on the hardware layer by using the platform provided by the virtualization layer. This computing service architecture that supports computing instances is illustrated in more detail in FIG. 4.

The service provider environment 500 may include an instance launcher 525. The instance launcher 525 may be configured to launch a base computing instance, such as by making an API call as has been described previously. The service provider environment may also include an installer 530. The installer 530 may be configured to download and install a software application. For example, the software application may be a third party software application. The software application may be enterprise software. The installer 530 may build an application layer by installing the software. The installation of the software or the building of the application layer may result in modification of the base computing instance. The modified base computing instance may be referred to as a modified computing instance The service provider environment 500 may include an image loader 535 to access a machine image data store 515. The image loader may, for example, make storage API calls as has been described previously to access the storage location of the machine image data store 515. The machine image data store may store machine images of modified computing instances.

The service provider environment may include a script engine 545. The script engine 545 may be configured to apply a configuration to a modified computing instance accessed from the machine image data store 515 via the image loader 535. The script engine 545 may apply the configuration from a customer-defined configuration stored in the configuration data store 520. The customer-defined configuration may be received from a customer at client device 560. Execution of one or more scripts to apply the configuration to the modified computing instance may result in what is referred to herein as a configured computing instance. The instance launcher 525 may be configured to launch the modified computing instance from a machine image in the machine image data store 515 and to execute the script engine 545 to obtain the configured computing instance based on instructions from the client device 560, where the instructions may indicate for example a type of computing instance to launch and software desired on the computing instance, which instruction may inform selection of the machine image from the machine image data store 515.

In one example, at least one of the machine images is an image of a modified computing instance including a mail server or a web application platform server. In a more detailed example, the machine images include machine images for at least one of the mail server and at least one of the web application platform server. The instance launcher 525 executes the script engine 545 on the mail server and the web application platform server to apply the configuration data 520 to the mail server and the web application platform server, the configuration being a common configuration common to the mail server and the web application platform server.

The service provider environment 500 may include a permissions modifier 540. The permissions modifier 540 may be configured to modify permissions to a machine image in the machine image data store 515 to allow or enable a customer to access, instantiate or configure the machine image. The service provider environment 500 may also include a template generator 550. The template generator 550 may generate a reusable template, referred to herein as a formation template. The formation template may be a template of the configured computing instance for use in replicating the configured computing instance.

Client devices 560 may be available to access and interact with the service provider environment 500 or server in a computing service provider environment 500 or one or more computing instances or clusters, over a network 555. Example client devices 560 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display that may receive and present the message content.

The service provider environment 500 may be implemented across one or more computing device(s) connected via a network 555. For example, a computing device may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, one or more processors 505 and one or more memory modules 510. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 5 may be representative of a plurality of client devices 560 that may be coupled to the network 555. The client device(s) 560 may communicate with the computing device over any appropriate network, including an intranet, the Internet, a cellular network, a local area network (LAN), a wide area network (WAN), a wireless data network or a similar network or combination of networks. In one example, the network 555 may be the communications network of the present technology.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 6:
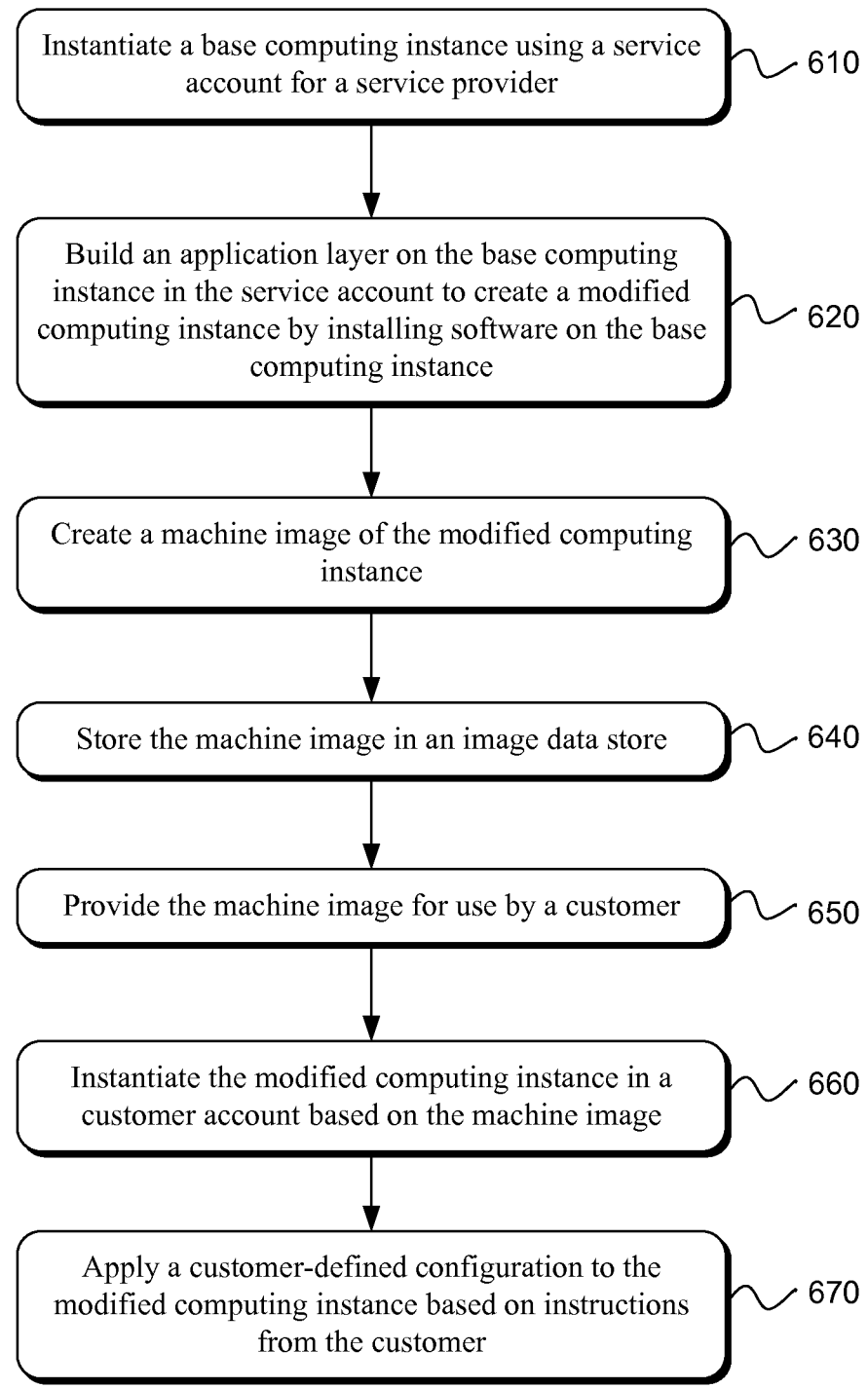
FIGS. 6-7 are flow diagrams for methods of rapidly deploying computing instances in accordance with examples of the present technology.
Figure 7:
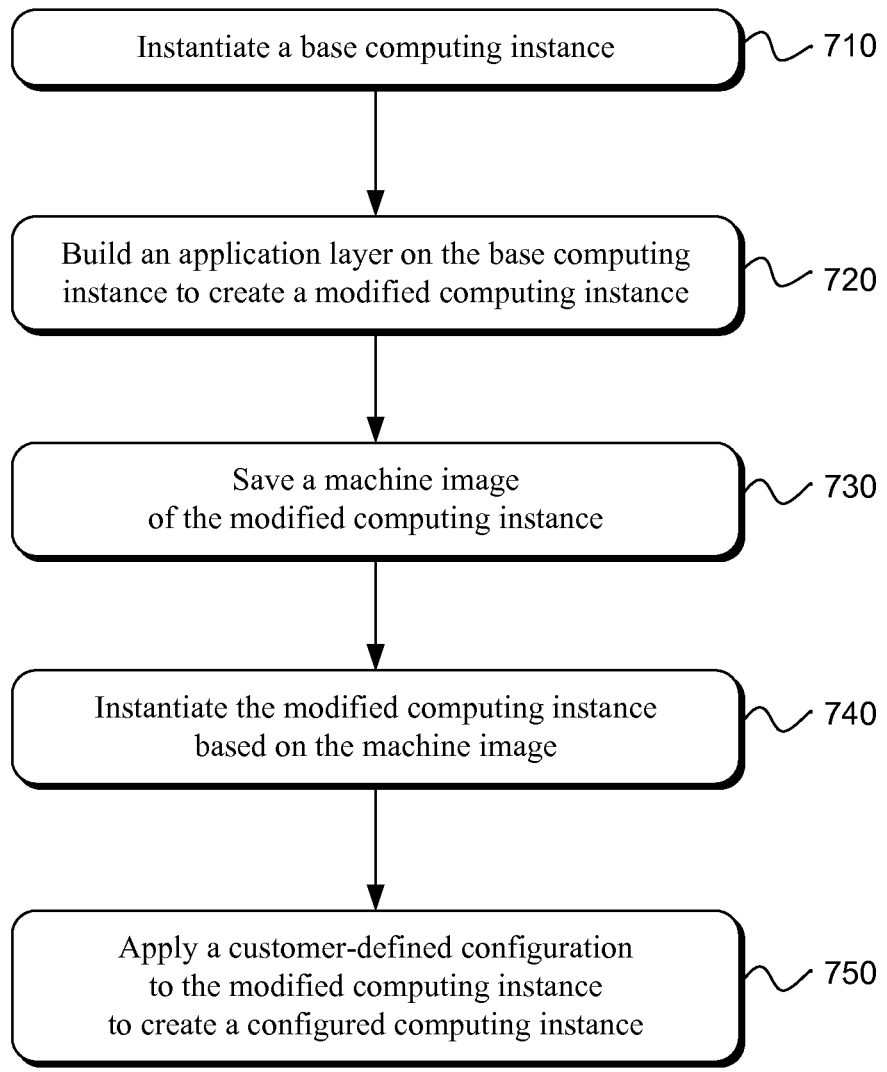

FIGS. 6-7 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 6, a flow diagram of a method is illustrated for rapid deployment of computing instances using machine images. The method may include instantiating 610 a base computing instance using a service account for a computing service provider. An application layer may be built 620 on the base computing instance in the service account to create a modified computing instance. The application layer may be built by installing software on the base computing instance. A machine image of the modified computing instance may be created 630 or captured. The machine image may be stored 640 in an image data store. The machine image may be provided 650 for use by a customer. The modified computing instance may be instantiated 660 in a customer account based on the machine image. A customer-defined configuration may be applied 670 to the modified computing instance based on instructions from the customer.

In a more detailed example, the method may instantiating a plurality of base computing instances and building a different application layer for each of the plurality of base computing instances. Likewise, machine images may be created from each modified computing instance. The machine images of each of the modified computing instances may be stored and made available to customers. One or more of these machine images may be provided for use by the customer. Upon request from the customer, multiple of the modified computing instances may be instantiated from the machine images. The customer-defined configuration may be applied to each of the plurality of the modified computing instances based on the machine images. In other words, the customer-defined configuration may be a common configuration. In one example, the customer may define specific configurations which are applicable to fewer than all of the modified computing instances to be instantiated. For example, certain configurations may not be applicable to certain software stacks on a modified computing instance and computing service provider logic may recognize this inapplicability and not attempt to apply the configuration to these modified computing instances.

In one example, the machine images may be provided for use by the customer by transferring the machine image to a customer account from a service account for instantiating the modified computing instance based on the machine image. In another example, the machine images may be provided for use by the customer by sharing permissions for the machine image with a customer account for the customer to access and instantiate the modified computing instance based on the machine image. In this example, the machine images may remain in the service account and be executed in the service account.

The method may include providing a graphical user interface for display to the customer to enable customizability of the configuration. Some example configuration items may include a domain, a subnet space, a region, an availability zone and so forth as have been described above.

The method may include creating machine images at any of a variety of levels of preparedness for use. The machine images may be created when the modified computing instances are fully ready, partially ready, etc., where readiness or preparedness may relate to a stage of installation of software, configuration of the software, configuration of the operating system, application of system or software patches or updates, etc. By creating a machine image with a level of preparedness desired by a customer or potential customer, some of the lengthier processes in setting up a new computing instance to the level of preparedness may be avoided and a customer may begin using the computing instance much more rapidly. The images may be created, for example, from modified computing instances that are up and running, with desired software fully installed, patches or updates, applied, etc. In contrast, with long start up times a customer may forget the instances are running, costs may add up and the customer may choose to not try the instances. Using the present technology, short start times are enabled, difficult configurations are avoided and a customer is more likely to maintain interest and keep costs low.

In some examples, this or other methods described herein may be implemented wholly or partially as computer readable program code executed by a processor and the computer readable code may be embodied on a non-transitory computer usable medium.

Referring now to FIG. 7, a flow diagram of a method is illustrated for rapid deployment of computing instances. The method may include instantiating 710 a base computing instance and building 720 an application layer on the base computing instance to create a modified computing instance. A machine image of the modified computing instance may be saved 730. The modified computing instance may be instantiated 740 based on the machine image and a customer-defined configuration may be applied 750 to the modified computing instance to obtain a configured computing instance. In some examples, instantiating the base computing instance, building the application layer and saving the machine image may be performed using a service account. Instantiating the modified computing instance and applying the configuration may be performed using a customer account separate from the service account. In this example, the method may further include sharing the machine image in the service account with the customer account. Sharing may include transferring or copying the machine image to the customer account from the service account and/or may include modifying permissions on the machine image to enable the customer account to access the machine image.

The method may include configuring the modified computing instance by setting a domain and/or storage configuration for the computing instance. The setting of the domain and/or storage configuration, networking options, etc. may be based on the customer-defined configuration. The domain may be the sole domain for the computing instance or may be a secondary domain for the computing instance, where the primary domain may be a domain configured for the computing instance prior to creating the machine image of the modified computing instance. The primary domain may be a default, example or dummy domain. For some customers, the inclusion or use of the primary domain in these computing instances may be an insignificant or trivial concern. For some customers desiring a clean computing instance to work from, the primary domain may be replaced by the secondary domain upon customer request and after the customer has received the machine image, permissions to the machine image, the formation template, or permissions to the formation template.

The method may include building the application layer. Building the application layer may entail downloading and installing software packages. In one example, these software packages may be third-party enterprise software packages, the software packages being developed by or available from third-parties to the computing service provider and/or the developer of the operating system for the computing instance. A variety of types of enterprise software is available. For purposes of discussion, the types of enterprise software may be categorized by business function. These categories of enterprise software may overlap due to systemic interpretation. Some example category types of enterprise software may include accounting software, business intelligence, business process management, content management system (CMS), customer relationship management (CRM), database, master data management (MDM), enterprise resource planning (ERP), enterprise asset management (EAM) and supply chain management (SCM). Within these categories are a large number of specific software packages provided by a number of third-party vendors. Any one or more types of enterprise software from any one or more third-party vendors may be used with the present technology.

In the context of building the application layer, a variety of the third party software packages may be installed on different computing instances for creating machine images each including one or more of the software packages. Different of the plurality of machine images include different third-party software packages. The method may include receiving selection of the machine image from among a plurality of machine images. For example, a customer may be presented with a graphical user interface listing different available third-party software packages. The customer may select a desired software package. Based on this selection, the computing service provider may select an appropriate machine image corresponding to the selected software package. Thus, the method may include prompting the customer to select a type of computing instance, selecting the machine image based on the type of computing instance selected by the customer, and providing the machine image to the customer based on the type of computing instance selected. The machine image may be provided to or made available for use by the customer. The machine image may also be considered in the creation or generation of a formation template.

The method may include generating a formation template. Formation templates may be a template for service or application architectures and may be used for rapid and reliable provisioning of the services or applications (called "stacks"). The formation templates enable easy updates or replication of the stacks. The formation template may be generated from the configured computing instance. In other words, the formation template may be based on the machine image(s) selected by the customer and the configuration applied to the machine image(s) at the request of the customer. The formation template may be for use in rebuilding the application layer including the customer-defined configuration on another computing instance. A customer may access or use the formation template using an access identifier. For example, the access identifier may be a URL (Uniform Resource Locator) or other suitable access identifier. This access identifier may be provided to the customer upon request or may be provided automatically. In one example, the formation template is automatically generated after applying the customer-defined configuration to the modified computing instance and the access identifier is provided to the customer.

The method may include applying the customer-defined configuration by executing a task automation and configuration management framework script to call operating system management instrumentation and modify variables of the modified computing instance. In the context of the Windows® operating system, such a script may be a 'powershell' script. However, other suitable script types may also be used.

The method may include instantiating multiple modified computing instances in parallel. While some machine images of computing instances may have dependencies from others and instantiating such computing instances in a sequence may be desirable, many computing instances may be instantiated in parallel to reduce the time from the customer request to the time the instances are available for use. The modified instances may be instantiated in parallel using the customer-defined configuration such that the plurality of the modified computing instances are interoperable. For example, by applying a customer-defined domain to each of the modified computing instances, accounting computing instances, customer relationship management computing instances, database computing instances, etc. may readily find one another and communicate to exchange data and otherwise provide a seamless or unified computing environment for use by the customer.

Figure 8:
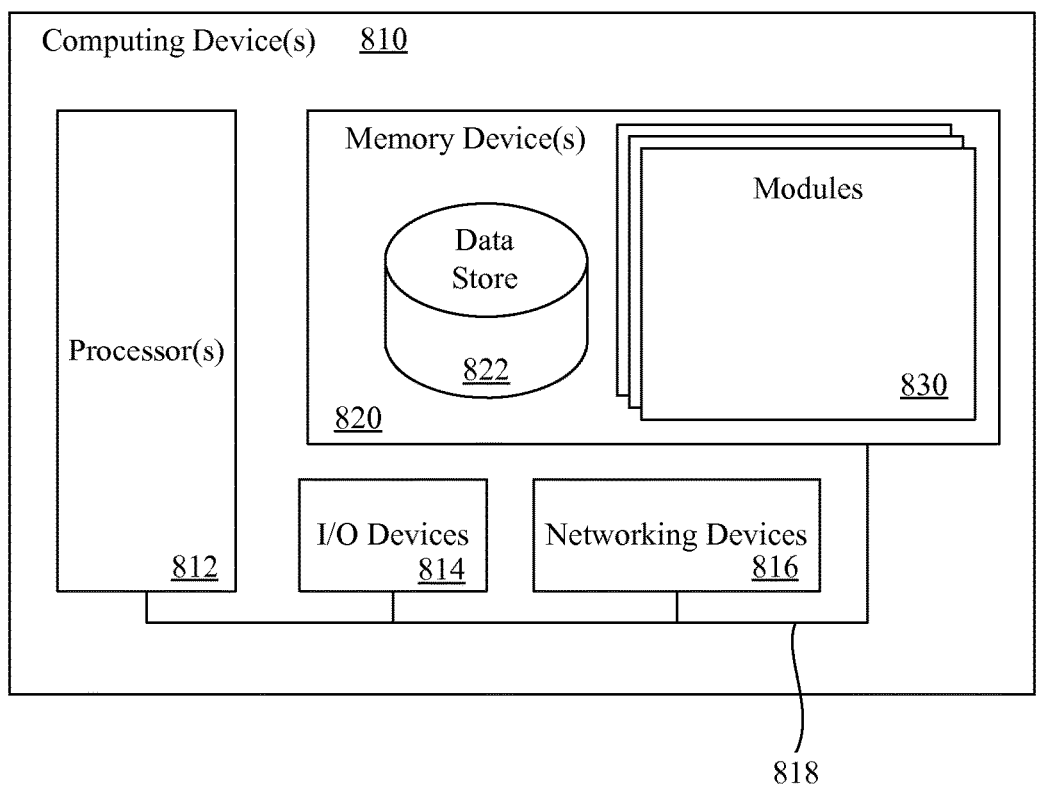
FIG. 8 is a block diagram of a computing system for use in deployment of computing instances in accordance with an example of the present technology.

FIG. 8 illustrates a computing device 810 on which services or modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 830 that are executable by the processor(s) and data for the modules. A data store 822 may also be located in the memory device 820 for storing data related to the modules and other applications along with an operating system that is executable by the processor(s) 812.

The computing device 810 may further include or be in communication with a client device, which may include a display device. The client device may be available for an administrator to use in interfacing with the computing device 810, such as to review operation of a virtual computing instance, make improvements to machine learning models and so forth.

Various applications may be stored in the memory device 820 and may be executable by the processor(s) 812. Components or modules discussed in this description that may be implemented in the form of software using high programming level languages that are compiled, interpreted or executed using a hybrid of the methods.

The computing device 810 may also have access to I/O (input/output) devices 814 that are usable by the computing devices. An example of an I/O device 814 is a display screen that is available to display output from the computing devices. Other known I/O device may be used with the computing device as desired. Networking devices 816 and similar communication devices may be included in the computing device 810. The networking devices 816 may be wired or wireless networking devices 816 that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor 812. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computing system for providing machine images of computing instances for rapid deployment, comprising:
   a processor;
   a memory in electronic communication with the processor;
   instructions stored in the memory, the instructions being executable by the processor to:
   instantiate a base computing instance using a service account for a computing service provider;
   build an application layer on the base computing instance in the service account to create a modified computing instance by installing software on the base computing instance;
   create a machine image of the modified computing instance;
   store the machine image in an image data store;
   provide the machine image for use by a customer;
   instantiate the modified computing instance in a customer account based on the machine image;
   apply a customer-defined networking configuration to the modified computing instance based on instructions from the customer to obtain a configured computing instance;
   generate a reusable formation template from the configured computing instance for use in replicating the configured computing instance, wherein the reusable formation template includes the customer-defined networking configuration and a link to the machine image of the modified computing instance; and
   replicate the configured computing instance including the application layer using the customer-defined networking configuration and the machine image at the link in the reusable formation template.

2. The computing system of claim 1, further configured to:
   instantiate a plurality of identical base computing instances,
   build a different application layer for each of the plurality of base computing instances, create machine images of each modified computing instance,
   store machine images of each of the modified computing instances,
   provide the machine images for use by the customer, and
   instantiate a plurality of the modified computing instances based on the machine images and apply the customer-defined networking configuration to each of the plurality of the modified computing instances based on the machine images.

3. The computing system of claim 1, further configured to provide the machine image for use by the customer by transferring the machine image to a customer account for instantiating the modified computing instance based on the machine image.

4. The computing system of claim 1, further configured to provide the machine image for use by the customer by sharing permissions for the machine image in a machine image data store with a customer account for the customer to access and instantiate the modified computing instance based on the machine image.

5. The computing system of claim 1, further configured to provide a graphical user interface for display to the customer to enable customizability of the customer-defined networking configuration, including specification of: a domain or subnet space.

6. A computer-implemented method, comprising:
   instantiating a base computing instance, using a processor;
   building an application layer on the base computing instance to create a modified computing instance, using the processor;
   saving a machine image of the modified computing instance, using the processor;
   instantiating the modified computing instance in a customer account based on the machine image;
   applying a customer-defined networking configuration to the modified computing instance to obtain a configured computing instance;
   generating a reusable formation template from the configured computing instance to be used in replicating the configured computing instance, wherein the reusable formation template includes the customer-defined networking configuration and an identifier of the machine image of the modified computing instance; and
   replicating the configured computing instance using the customer-defined networking configuration and the machine image identified by the identifier in the reusable formation template.

7. The method of claim 6, further comprising configuring the modified computing instance by setting the domain and a storage configuration for the modified computing instance.

8. The method of claim 6, wherein building the application layer comprises downloading and installing at least one third-party software package on to the base computing instance, the method further comprising receiving selection of the machine image from among a plurality of machine images where each of the plurality of machine images include separate third-party software packages.

9. The method of claim 6, further comprising providing an access identifier to a customer for accessing the reusable formation template.

10. The method of claim 6, further comprising applying the customer-defined networking configuration by executing a task automation and configuration management framework script to call operating system management instrumentation and modify variables of the modified computing instance.

11. The method of claim 6, further comprising instantiating the base computing instance, building the application layer and saving the machine image in a service account, and instantiating the modified computing instance and applying the customer-defined networking configuration using a customer account separate from the service account.

12. The method of claim 11, further comprising sharing the machine image in the service account with the customer account.

13. The method of claim 6, further comprising:
prompting a customer to select a type of computing instance;
selecting the machine image based on the type of computing instance selected; and
providing the machine image to the customer.

14. The method of claim 6, further comprising instantiating a plurality of the modified computing instances in parallel using the customer-defined networking configuration such that the plurality of the modified computing instances are interoperable.

15. A non-transitory computer-readable medium comprising computer-executable instructions which implement a system, comprising:
an instance launcher to launch a base computing instance;
an installer to download and install a third party software application to build an application layer and modify the base computing instance to a modified computing instance;
an image generator to generate a machine image of the modified computing instance and store the machine image in a machine image data store;
an image loader to access the machine image data store and to load the machine image of the modified computing instance in a customer account;
a script engine configured to apply a networking configuration to the modified computing instance accessed from the machine image data store via the image loader to obtain a configured computing instance, wherein the networking configuration defines a name, a CIDR (Classless Inter-Domain Routing) range, an IP (Internet Protocol) range, an SSL (Secure Socket Layer) certificate, or a DNS (Domain Name System) entry; and
a template generator to generate a reusable formation template from the configured computing instance for use in replicating the configured computing instance, the reusable formation template including the networking configuration and an identifier of the machine image of the modified computing instance; wherein
the instance launcher is further configured to replicate the configured computing instance by launching the modified computing instance from a machine image in the machine image data store based on the identifier in the reusable formation template and to initiate the script engine to apply the networking configuration to the modified computing instance and complete a configuration process.

16. The computer-readable medium of claim 15, further comprising providing a graphical user interface for display to a customer to enable customizability of the networking configuration, including specification of a region or availability zone for the modified computing instance.

17. The computer-readable medium of claim 15, wherein the modified computing instance includes a plurality of modified computing instances each having a different software stack from one another, and the instance launcher executes the script engine to apply the networking configuration to the plurality of modified computing instances, the networking configuration being a networking configuration common to the plurality of modified computing instances.

18. The computer-readable medium of claim 15, further comprising a permissions modifier configured to modify permissions to a machine image in the machine image data store to allow a customer to access, instantiate or configure the machine image.

* * * * *